United States Patent [19]
Skidmore

[11] 3,742,486
[45] June 26, 1973

[54] ANALOG TO DIGITAL CONVERTER

[76] Inventor: Charles L. Skidmore, 1152 Nottingham Road, Grosse Pointe Park, Mich. 48230

[22] Filed: Feb. 3, 1971

[21] Appl. No.: 112,185

[52] U.S. Cl. ........ 340/347 P, 178/DIG. 2, 250/227, 250/233
[51] Int. Cl. .................................. G08c 9/06
[58] Field of Search .............. 250/227; 178/DIG. 2; 235/92 PC; 340/347 P

[56] References Cited
UNITED STATES PATENTS

| | | | |
|---|---|---|---|
| 3,152,325 | 10/1964 | Kaestner | 340/347 P |
| 3,538,312 | 11/1970 | Genahr | 235/92 V |
| 3,388,262 | 6/1968 | Stutz | 340/347 P |
| 2,886,717 | 5/1959 | Williamson et al. | 235/92 V |
| 3,267,932 | 8/1966 | Valliere | 178/DIG. 2 |

Primary Examiner—Maynard R. Wilbur
Assistant Examiner—Jeremiah Glassman
Attorney—Whittemore, Hulbert & Belknap

[57] ABSTRACT

Structure for and method of converting an analog shaft position into a digital read out. The structure comprises a wheel including a rim in the form of a cylinder concentrically secured to the shaft for rotation therewith having a plurality of axially extending alternate transparent and opaque areas positioned angularly about the drum rim extending parallel to the shaft, a light source positioned on one side of the rim of the drum in angularly spaced relation to a digital sensor which is also positioned adjacent the rim of the drum on the same side of the drum as the light source, and a fiber optic bundle having the individual fibers thereof reversed at the ends thereof with respect to a single direction of rotation of the drum positioned on the other side of the drum with one end opposite the light source and the other end opposite the digital sensor. The method includes rotating the shaft to rotate the wheel and thus pass the alternate translucent and opaque areas past the light source to provide bits of information in the fiber optic bundle which are transferred through the rotating wheel rim at the light source and are again transferred through the rotating wheel rim in reverse order at the digital sensor whereby the number of digital bits sensed by the sensor in a single revolution of the shaft is doubled with respect to that which would be sensed if the individual fibers in the fiber optic bundle were not reversed.

6 Claims, 4 Drawing Figures

INVENTOR
CHARLES L. SKIDMORE
ATTORNEYS

ANALOG TO DIGITAL CONVERTER

BACKGROUND OF THE INVENTION

1. Field of the Invention

The invention relates to analog to digital converters and refers more specifically to a rotary device for converting the analog position of a rotatable shaft into a digital read out or display which is particularly simple, economical and efficient.

2. Description of the Prior Art

In the past, analog to digital converters have often been mechanical. Wherein a light source and a light sensitive member have been utilized to provide a digital read out of shaft position, a rotary flat disc having a light on one side thereof and a digital sensor array on the other side thereof has been utilized. Such structure is limited in application due to the physical size of the disc required and does not provide the accuracy necessary for making fine measurements efficiently. Wherein fine measurements have been capable of being made accurately in the past by analog to digital converters, the converters have been complicated, expensive and therefore undesirable for many uses.

SUMMARY OF THE INVENTION

The invention includes a rotary structure for and method of providing a digital read out of the analog position of a rotary shaft and more particularly includes a wheel secured to the shaft for rotation therewith, which wheel includes a rim having alternate transparent and opaque lines thereon extending axially of the shaft and parallel thereto, a light source positioned adjacent the rim of the wheel at a first point thereon, a digital sensor array positioned adjacent the rim of the wheel at a second point thereon on the same side of the rim of the wheel, and a fiber optic bundle having opposite ends adjacent the light source and sensor array on the opposite side of the wheel rim.

The individual fibers of the fiber optic bundle are reversed at the opposite ends thereof with respect to one direction of rotation of the wheel to double the apparent number of alternate transparent and opaque lines sensed.

The light source and sensor array may be positioned radially inwardly or outwardly of the rim of the drum with the fiber optic bundle always being on the other side of the rim of the drum.

The method of operation of the analog to digital converter includes the steps of rotating the wheel in one direction past the opposite ends of the fiber optic bundle and sensing the resulting patterns of light and dark passed twice through the rotating drum.

DESCRIPTION OF THE PREFERRED EMBODIMENTS

Figure 1:
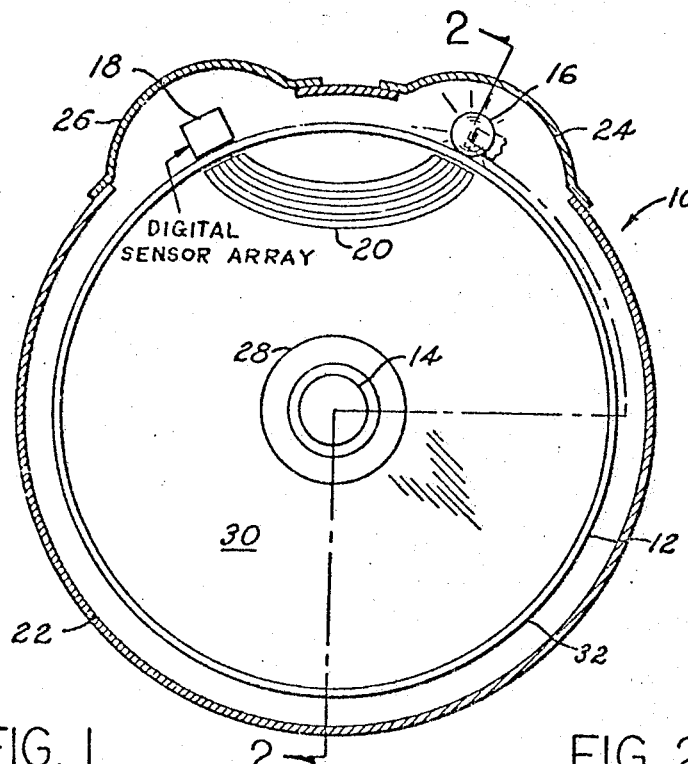
FIG. 1 is a diagrammatic elevation view of an analog to digital converter constructed in accordance with the invention.

As shown best in FIG. 1, the analog to digital converter 10 includes a wheel 12 rigidly secured to the shaft 14 for rotation therewith, a light source 16 for passing light through the rim of the wheel 12, a digital sensor array 18 for producing a digital read out signal in response to light patterns senses thereby, and a resolver 20 for passing light patterns received at one end thereof out the other end thereof. A dust cover 22 and a light cover and a sensor cover 24 and 26 respectively are also included in the converter 10.

More particularly, the shaft 14 may be any shaft, the analog rotational position of which it is desired to display or read out digitally. One such shaft would be the capstan shaft in the measuring device disclosed in applicant's copending patent application Ser. No. 804,416, filed Mar. 6, 1969. Other instances where it is desired to provide a digital signal output equal to the analog position of a shaft are well known and will not be considered here in detail.

The wheel 12 includes the hub 28 rigidly connected to the rotatable shaft 14 for rotation therewith, the web 30 and the axially extending cylindrical rim portion 32. The cylindrical rim portion 32 of the wheel 12, as shown, is positioned on the radially outer periphery of the web 30 and has alternate transparent and opaque line portions 34 therearound extending axially of the shaft 14, parallel therewith and concentric thereto.

With such a cylindrical rim portion 32 on wheel 12 it is possible to provide a great many digital bits circumferentially thereof. Thus, for example, 1,000 to 1,200 opaque lines of approximately 0.0004 inches width per inch are possible which properly spaced with equal transparent spaces and associated with a similar digital sensor array can produce as many as, for example, 100,000 discrete digital read out positions per 360° revolution of a 5 inch diameter wheel 12.

It is not the intention to claim the construction of transparent and opaque parallel line grids since they may be produced by known photographic techniques on, for example, glass or similar plastics. These grids will not, therefore, be considered in greater detail herein.

The light source 24 may be any small light source designed to provide light of steady intensity for use in conjunction with optic fiber bundles. The normal electrical circuit for energizing the light 24 is not illustrated since the provision of such power will be obvious to those skilled in the electrical arts.

The digital sensor array 18 is again a known device and may, for example, be a plurality of photosensitive devices as indicated in U.S. Pat. Nos. 3,421,009 and 3,483,389, for example.

The resolver as presently contemplated is a bundle of optical fibers such as, for example, disclosed in U.S. Pat. No. 3,016,785. Such fibers may have a diameter of from 0.00006 inches to 0.0004 inches, for example, and may be obtained from commercial sources in bundles arranged as desired. Presently, it is intended that the optic fiber diameter and the width of the transparent as well as of the opaque lines on the rim of the wheel 12 will be equal, although several layers of smaller diameter bundles may be used to provide fiber optics having the width of the transparent and opaque lines. In addition, since the fiber optic material sheds light through the sides of the fibers to some small extent, provision is made within preferred embodiments to overcome this shedding of light. Thus, a shield 36 of gold or a vacuum deposited layer of aluminum may be employed to isolate the light loss characteristics from adjacent layers. Each shield extends on a plane parallel with the axis of rotation of the cylindrical rim 32 and the lines and spaces thereon.

Thus, with the sensor array 18 and with the individual fibers at the opposite ends of the optic fiber bundle resolver 20 reversed with respect to a single direction of rotation of the wheel 12 and with the light 16 angularly spaced apart with respect to the sensor 18 as shown, the number of divisions, that is opaque and transparent areas, sensed by the sensor 18 will be double that actually provided on the rim of the wheel 12 due to the effect at the sensor 18 of the two light patterns from the resolver 20 and the rotating wheel at the sensor 18 appearing to be moving in opposite directions. Such appearance is not unlike that of a view of a picket fence as it would appear on walking by the picket fence as against the view of the same picket fence if it were moving at the same speed of the walker, but in the opposite direction. That is to say, the light and dark patterns would occur twice as fast for the same distance walked.

Thus, in overall operation of the analog to digital converter of the invention, the wheel 12 is secured to the shaft 14, the analog position of which it is desired to provide a digital read out for. The light is mounted on dust cover 22. A sensing array 18 is provided which provides a digital read out in accordance with light patterns sensed thereby, which is again mounted on the dust cover 22. The light and sensor 16 and 18 are covered by the separate light cover 24 and sensor cover 26 respectively.

The resolver which is an optic fiber bundle with the individual fibers thereof reversed at the opposite ends with respect to a single direction of rotation of the wheel 12 is positioned on, for example, a bearing (not shown) in which the shaft 14 is rotatably mounted. The opposite ends of the resolver 20, as shown, are positioned adjacent the light 16 and sensor 18.

The wheel 12 is then rotated to provide a light pattern display at the end of the resolver 20 adjacent the light 24 due to the light passing through the transparent and not the opaque portions of the rim of the wheel 12 on rotation thereof. The light pattern from the resolver is again passed from the other end of the resolver 20 back through the moving rim of the wheel 12 to provide a further modified light pattern at the sensor 18. The sensor 18 then provides a digital read out signal representing the analog digital position of the shaft 14 as desired.

Figure 2:
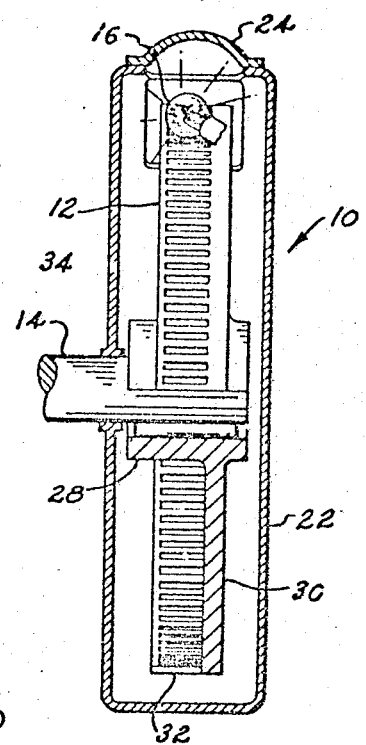
FIG. 2 is a cross section view of the analog to digital converter illustrated in FIG. 1 taken substantially on the line 2—2 of FIG. 1.
Figure 3:
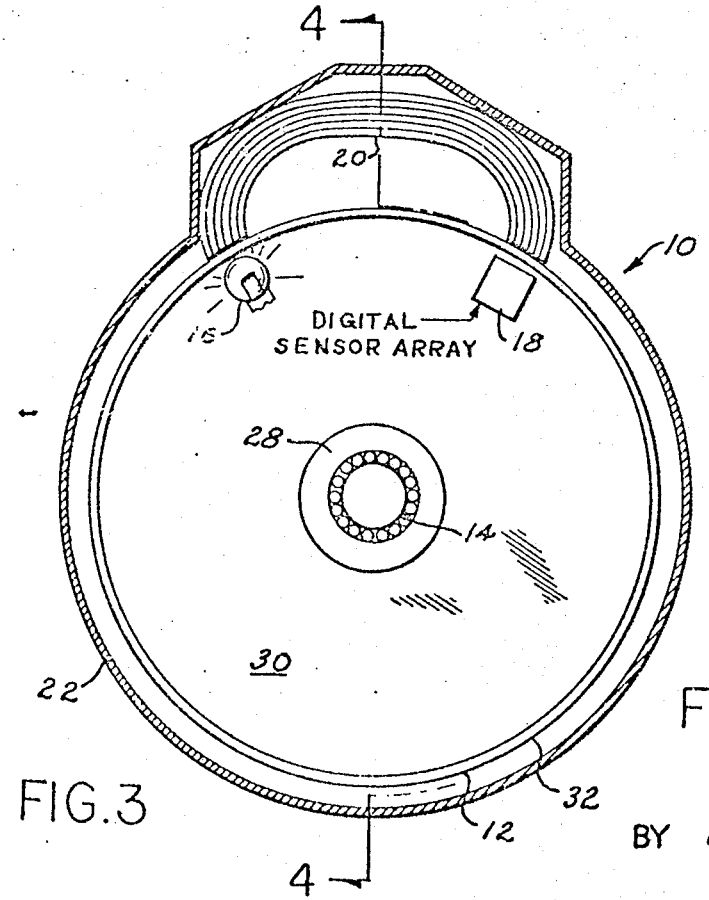
FIG. 3 is an elevation view of modified analog to digital converter structure constructed in accordance with the invention.
Figure 4:
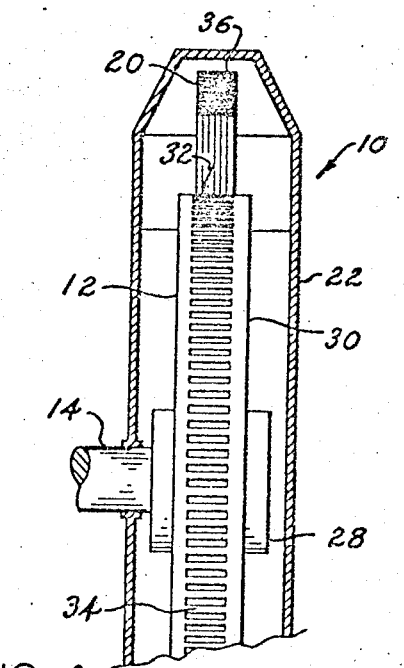
FIG. 4 is a partial elevation view of the modified analog to digital converter structure illustrated in FIG. 3, taken substantially on the line 4—4 in FIG. 3.

It will be noted that in the embodiment of the invention illustrated in FIGS. 1 and 2, the light source and sensors 24 and 26 are mounted on the dust cover 22 radially outwardly of the rim 32 of wheel 12. In contrast, the resolver is mounted radially inwardly of the rim 32 on bearing structure (not shown) as previously considered. Alternatively, the light 16 and the sensor array 18 may be mounted radially inwardly of the rim 32 of the wheel 12 and the resolver 20 may be mounted radially outwardly of the rim 22. Such modified structure is illustrated in FIGS. 3 and 4 wherein similar reference numerals have been provided for similar components of the analog to digital converter 10. Operation of the modified structure of FIGS. 3 and 4 is similar to that of the converter structure illustrated in FIGS. 1 and 2.

While one embodiment and a modification thereof of the invention have been considered in detail, it will be understood that other embodiments and modifications are contemplated. It is therefore the intention to include all the modifications and embodiments of the invention within the scope of the appended claims.

What I claim as my invention is:

1. An analog to digital converter comprising a rotatable shaft, the rotated position of which represents an analog value with respect to an initial position thereof which it is desired to convert to a corresponding digital value, a wheel having a rim in the form of a hollow cylinder extending axially parallel to and concentric with the shaft which wheel is secured to the shaft for rotation therewith and which rim includes a plurality of angularly spaced transparent and opaque lines thereon parallel with each other and parallel with the axis of rotation of the shaft, a stationary light source on one side of the rim at a first point adjacent the rim, a digital sensor array positioned at a second point adjacent the rim which is angularly spaced from the first point for receiving light patterns passed through the rim and providing a digital signal in accordance therewith and stationary means for passing light from the light source passing through the rim at the first point back to and through the rim at the second point and into the sensor array including an optic fiber bundle, one end of which extends radially of and is positioned immediately adjacent the cylinder at the first point and the other end of which extends radially of and is positioned immediately adjacent the cylinder at the second point.

2. Structure as set forth in claim 1 wherein the ends of the fibers in the optic fiber bundle at the opposite ends thereof are in reverse order at the second point with respect to a single direction of rotation of the cylinder and the order of the fibers at the first point.

3. Structure as set forth in claim 1 wherein the light source and sensor array are positioned radially outwardly of the rim of the wheel and the optic fiber bundle is positioned radially inwardly of the rim.

4. Structure as set forth in claim 1 wherein the light source and sensor array are positioned radially inwardly of the rim of the wheel and the optic fiber bundle is positioned radially outwardly of the rim.

5. An analog to digital converter comprising a rotatable shaft, the rotated position of which represents an analog value with respect to an initial position thereof which it is desired to convert to a corresponding digital value, a wheel having a rim in the form of a hollow cylinder extending axially parallel to and concentric with the shaft which wheel is secured to the shaft for rotation therewith and which rim includes a plurality of angularly spaced transparent and opaque lines thereon parallel with each other and parallel with the axis of rotation of the shaft, a stationary light source on one side of the rim at a first point adjacent the rim, a digital sensor array positioned at a second point adjacent the rim which is angularly spaced from the first point for receiving light patterns passed through the rim and providing a digital signal in accordance therewith and an optic fiber bundle one end of which extends radially of and is positioned immediately adjacent the cylinder at the first point and the other end of which extends radially of and is positioned immediately adjacent the cylinder at the second point for passing light from the light source passing through the rim at the first point back to and through the rim at the second point and into the sensor array, the ends of the fibers in the optic fiber bundle at the opposite ends of the optic fiber bundle being in reverse order at the second point with respect to a single direction of rotation of the cylinder and the order of the ends of the fibers in the optic fiber bundle at the first point wherein the light source and sensor array are positioned radially outwardly of the rim of the wheel and the optic fiber bundle is positioned radially inwardly of the rim.

6. An analog to digital converter comprising a rotatable shaft, the rotated position of which represents an analog value with respect to an initial position thereof which it is desired to convert to a corresponding digital value, a wheel having a rim in the form of a hollow cylinder extending axially parallel to and concentric with the shaft which wheel is secured to the shaft for rotation therewith and which rim includes a plurality of angularly spaced transparent and opaque lines thereon parallel with each other and parallel with the axis of rotation of the shaft, a stationary light source on one side of the rim at a first point adjacent the rim, a digital sensor array positioned at a second point adjacent the rim which is angularly spaced from the first point for receiving light patterns passed through the rim and providing a digital signal in accordance therewith and an optic fiber bundle one end of which extends radially o and is positioned immediately adjacent the cylinder a the first point and the other end of which extends radially of and is positioned immediately adjacent the cylinder at the second point for passing light from the light source passing through the rim at the first point back to and through the rim at the second point and into the sensor array, the ends of the fibers in the optic fiber bundle at the opposite ends of the optic fiber bundle being in reverse order at the second point with respect to a single direction of rotation of the cylinder and the order of the ends of the fibers in the optic fiber bundle at the first point wherein the light source and sensor array are positioned radially inwardly of the rim of the wheel and the optic fiber bundle is positioned radially outwardly of the rim.

* * * * *